(12) United States Patent
Mihara et al.

(10) Patent No.: US 10,006,408 B2
(45) Date of Patent: Jun. 26, 2018

(54) THREE-PULSE GAS GENERATOR AND OPERATION METHOD THEREOF

(71) Applicant: MITSUBISHI HEAVY INDUSTRIES, LTD., Tokyo (JP)

(72) Inventors: Chiyako Mihara, Tokyo (JP); Tasuku Suzuki, Tokyo (JP); Katsunori Ieki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 993 days.

(21) Appl. No.: 14/455,037

(22) Filed: Aug. 8, 2014

(65) Prior Publication Data

US 2015/0047316 A1 Feb. 19, 2015

(30) Foreign Application Priority Data

Aug. 13, 2013 (JP) .................................. 2013-168043

(51) Int. Cl.
*F02K 9/28* (2006.01)
*F02K 9/12* (2006.01)
(Continued)

(52) U.S. Cl.
CPC .................. *F02K 9/28* (2013.01); *F02K 9/12* (2013.01); *F02K 9/20* (2013.01); *F02K 9/18* (2013.01); *F05D 2210/12* (2013.01)

(58) Field of Classification Search
CPC ..... F02K 9/12; F02K 9/18; F02K 9/20; F02K 9/28
See application file for complete search history.

(56) References Cited

U.S. PATENT DOCUMENTS

| 2,816,721 A | 12/1957 | Taylor |
| 2,988,877 A * | 6/1961 | Shope ...................... F02K 9/10 |
| | | 102/287 |

(Continued)

FOREIGN PATENT DOCUMENTS

| DE | 39 24 858 | 2/1991 |
| EP | 2 503 135 | 9/2012 |

(Continued)

OTHER PUBLICATIONS

Notification of Reason for Refusal dated Dec. 13, 2016 in corresponding Japanese Application No. 2013-168043, with partial English translation.

Primary Examiner — Lorne Meade
(74) Attorney, Agent, or Firm — Wenderoth, Lind & Ponack, L.L.P.

(57) ABSTRACT

A multi-pulse gas generator includes a pressure vessel, an outer propellant arranged in the pressure vessel and which has a tubular shape, an intermediate propellant arranged inside the outer propellant and which has a tubular shape, an inner propellant arranged inside the intermediate propellant and which has a tubular shape, an internal structure arranged inside the inner propellant and fixed to the pressure vessel, a first barrier membrane arranged between the outer propellant and the intermediate propellant so as to isolate the outer propellant and the intermediate propellant from each other, and a second barrier membrane arranged between the intermediate propellant and the inner propellant so as to isolate the intermediate propellant and the inner propellant from each other. The outer propellant is supported on its outer surface by the pressure vessel. The inner propellant is supported on its inner surface by the internal structure.

5 Claims, 7 Drawing Sheets

(51) Int. Cl.
  *F02K 9/20* (2006.01)
  *F02K 9/18* (2006.01)

(56) References Cited

U.S. PATENT DOCUMENTS

| | | | | |
|---|---|---|---|---|
| 3,023,570 | A * | 3/1962 | Crouch | C06B 45/12 102/290 |
| 3,248,875 | A * | 5/1966 | Wolcott | F02K 9/94 60/250 |
| 3,293,855 | A * | 12/1966 | Cuttill | F02K 9/86 60/229 |
| 3,555,825 | A | 1/1971 | Dilchert | |
| 3,555,958 | A * | 1/1971 | Leasure, Jr. | F02K 9/14 86/1.1 |
| 3,677,010 | A * | 7/1972 | Fink | F02K 9/14 102/288 |
| 3,731,628 | A * | 5/1973 | Fink | F02K 9/14 102/374 |
| 3,857,239 | A * | 12/1974 | Brock | F02K 9/94 102/380 |
| 4,137,286 | A * | 1/1979 | Bornstein | F02K 9/12 102/531 |
| 4,357,795 | A * | 11/1982 | Bastian | F02K 9/12 60/204 |
| 4,429,634 | A * | 2/1984 | Byrd | C06B 45/10 102/290 |
| 4,729,317 | A * | 3/1988 | Burdette | C06B 45/12 102/287 |
| 4,866,930 | A * | 9/1989 | Fling | F02K 9/38 60/250 |
| 5,600,946 | A | 2/1997 | Dombrowski et al. | |
| 5,675,966 | A | 10/1997 | Dombrowski et al. | |
| 5,714,711 | A * | 2/1998 | Schumacher | C06B 45/12 102/289 |
| 7,281,367 | B2 * | 10/2007 | Rohrbaugh | F02K 9/28 60/204 |
| 8,397,486 | B2 * | 3/2013 | Mihara | F02K 9/95 102/287 |
| 9,261,048 | B2 * | 2/2016 | Suzuki | F02K 9/28 |
| 9,371,801 | B2 * | 6/2016 | Kishida | F02K 9/95 |
| 9,702,320 | B2 * | 7/2017 | Mihara | F02K 9/10 |
| 2005/0120703 | A1 | 6/2005 | Rohrbaugh et al. | |
| 2010/0218481 | A1 | 9/2010 | Mihara et al. | |
| 2012/0311993 | A1 | 12/2012 | Mihara et al. | |
| 2013/0014491 | A1 | 1/2013 | Suzuki et al. | |

FOREIGN PATENT DOCUMENTS

| | | |
|---|---|---|
| JP | 11-503802 | 3/1999 |
| JP | 4719182 | 7/2011 |
| JP | 2012-255362 | 12/2012 |
| JP | 2013-24034 | 2/2013 |

* cited by examiner

FORWARD DIRECTION ↔ BACKWARD DIRECTION

FORWARD DIRECTION ↔ BACKWARD DIRECTION

FORWARD DIRECTION ↔ BACKWARD DIRECTION

THREE-PULSE GAS GENERATOR AND OPERATION METHOD THEREOF

CROSS REFERENCE

This application claims a priority based on Japan Patent Application No. JP 2013-168043 filed on Aug. 13, 2013, the disclosure of which is hereby incorporated by reference herein in its entirety.

TECHNICAL FIELD

The present invention relates to a multi-pulse gas generator and an operation method thereof.

BACKGROUND ART

In operating a missile, it is required to secure high mobility at the terminal guidance. One approach is to use a multi-pulse rocket motor and activate an appropriate pulse at the terminal guidance to reaccelerate the missile. At the same time, it is often required to modify a trajectory of the missile by using a thruster.

A typical thruster has: a nozzle having a combustion gas exhaust hole; and an actuator that turns ON/OFF supply of combustion gas to the nozzle. A plurality of nozzles is arranged to arbitrary directions. The thruster performs trajectory control and attitude control for the missile by exhausting appropriate amount of combustion gas from a selected nozzle.

There are two methods for equipping the missile with the thruster. One is to fix the thruster to a combustion gas generator and equip the missile with the combustion gas generator (this type is hereinafter referred to as a separated thruster type). The other is to fix the thruster directly to a rocket motor (this type is hereinafter referred to as an unseparated thruster type).

In relation to the above, a two-pulse rocket motor is disclosed in Patent Literature 1 (Japanese Patent No. 4,719,182). The two-pulse rocket motor disclosed in Patent Literature 1 includes a second propellant loaded within a pressure vessel, a second igniter placed at an end surface of the second propellant, a barrier membrane disposed to cover both a whole of initial burning surface of the second propellant and the second igniter, and a first propellant loaded so as to cover a whole of the barrier membrane. Both the first propellant and the second propellant are formed in an internal-burning type propellant shape or an internal-end-burning type propellant shape. (Note that the internal-end-burning type is a type with which the inner surface burning and the end surface burning are occurred at the same time.) The barrier membrane includes an inner barrier membrane covering the inner surface of the second propellant and an aft barrier membrane covering the rear end surface of the second propellant. Respective ends of the aft barrier membrane and the inner barrier membrane are bonded with each other over an entire periphery.

Further, a multi-pulse rocket motor and a pulse unit thereof are disclosed in Patent Literature (Japanese Patent Publication JP-2012-255362). The pulse unit of the multi-pulse rocket motor disclosed in Patent Literature 2 has a structure with which it is possible to form a multi-pulse rocket motor of 3-pulse or more. The pulse unit includes a propellant loaded within a pressure vessel and formed in an internal-burning type propellant shape or an internal-end-burning type propellant shape, an igniter placed at an end surface of the propellant, a barrier membrane disposed to cover both a whole of initial burning surface of the propellant and the igniter, a forward joint arranged at a forward end of the pressure vessel, and a rearward joint arranged at a rearward end of the pressure vessel. The forward joint is formed so as to be connectable with a rearward joint of another pulse unit. On the other hand, the rearward joint is formed so as to be connectable with a forward joint of still another pulse unit.

Moreover, a combustion gas supply control device is disclosed in Patent Literature 3 (Japanese Patent Publication JP-2013-024034). The combustion gas supply control device disclosed in Patent Literature 3 is a device which can supply combustion gas to a selected combustion gas exhaust hole at a desired timing, in a combustion gas generator such as an unseparated thruster type multi-pulse rocket motor. The combustion gas supply control device includes a pressure vessel, a first propellant loaded within the pressure vessel to be burned at a first pulse, a second propellant loaded within the pressure vessel to be burned at a second pulse subsequent to the first pulse, a front motor head fixed to a front portion of the pressure vessel and having a combustion gas exhaust hole, and a rear motor head fixed to a rear portion of the pressure vessel and having a combustion gas exhaust hole. The combustion gas supply control device prevents combustion gas of the first propellant at the first pulse from flowing into the combustion gas exhaust hole of the front motor head and supplies combustion gas of the second propellant at the second pulse to the combustion gas exhaust hole of the front motor head.

By the way, in order to realize, for example, a three-pulse gas generator, three propellants corresponding to three pulses, respectively should be loaded in a pressure vessel of a limited size. In this case, it is necessary to consider an arrangement of the three propellants in the pressure vessel. Three propellants should be supported in the pressure vessel by some means. It is necessary to consider how to support the three propellants in order to burn the three propellants at a different timing.

Further, power of force obtained by combustion of the propellant depends on a burning area. Therefore, it is necessary to consider an arrangement of the propellants such that a sufficient burning area is secured in order to obtain desired power of force. However, it is difficult to arrange the propellants to secure the sufficient burning area in a limited space.

CITATION LIST

Patent Literature

[Patent Literature 1] Japanese Patent No. 4,719,182
[Patent Literature 2] Japanese Patent Publication JP-2012-255362
[Patent Literature 3] Japanese Patent Publication JP-2013-024034

SUMMARY

An object of the present invention is to provide a multi-pulse gas generator which has a compact structure and with which it is possible to increase the number of pulses.

The multi-pulse gas generator of the present invention includes a pressure vessel, an outer propellant disposed in the pressure vessel and which has a tubular shape, an intermediate propellant disposed inside the outer propellant and which has a tubular shape, an inner propellant disposed inside the intermediate propellant and which has a tubular shape, an internal structure disposed inside the inner propellant and fixed to the pressure vessel, a first barrier membrane disposed between the outer propellant and the intermediate propellant so as to isolate the outer propellant and the intermediate propellant from each other, and a second barrier membrane disposed between the intermediate propellant and the inner propellant so as to isolate the intermediate propellant and the inner propellant from each other. The outer propellant is supported on its outer surface by the pressure vessel. The inner propellant is supported on its inner surface by the internal structure.

The operation method of the multi-pulse gas generator according to the present invention includes combusting the intermediate propellant, combusting the outer propellant after combusting the intermediate propellant, and combusting the inner propellant after combusting the intermediate propellant.

According to the present invention, it is possible to provide a multi-pulse gas generator which has a compact structure and with which it is possible to increase the number of pulses.

BRIEF DESCRIPTION OF THE DRAWINGS

The accompanying drawings are incorporated into the specification to assist in explaining some embodiments. The drawings are not to be construed as limiting the inventions to only those examples illustrated and described.

DESCRIPTION OF EMBODIMENTS

Some embodiments will be described with reference to the attached drawings.

Figure 1:
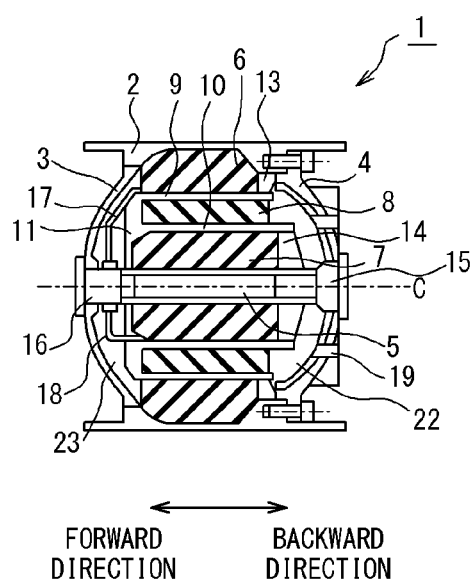
FIG. 1 is a schematic cross-sectional view of a multi-pulse gas generator according to some embodiments.

FIG. 1 is a schematic cross-sectional view of a multi-pulse gas generator 1 according to some embodiments. In FIG. 1, for the purpose of the explanation, forward direction and backward direction are illustrated.

At first, an outline of the configuration of the multi-pulse gas generator 1 will be described. The multi-pulse gas generator 1 includes a pressure vessel 2, three propellants (outer propellant 6, intermediate propellant 8, and inner propellant 7), and an internal structure 5. The pressure vessel 2 is formed in a tubular shape. Each of the three propellants is formed in a tubular shape and disposed in the pressure vessel 2. The internal structure 5 is formed in a tubular shape and disposed at a central portion of the pressure vessel 2. The outermost propellant (the outer propellant 6) is supported on its outer surface by the pressure vessel 2. On the other hand, the innermost propellant (the inner propellant 7) is supported on its inner surface by the internal structure 5. Note that the internal structure 5 is fixed to the pressure vessel 2. The intermediate propellant 8 is sandwiched between the inner propellant 7 and the outer propellant 6 and supported by the inner propellant 7 and the outer propellant 6.

By adopting the above mentioned configuration, it is possible to arrange the three propellants in the pressure vessel 2. Because the multi-pulse gas generator 1 includes the internal structure 5, it is possible to support the inner propellant 7 by the internal structure 5. Because the inner propellant 7 is supported by the internal structure 5, it is possible to support the intermediate propellant 8 by sandwiching the intermediate propellant 8 between the outer propellant 6 and the inner propellant 7. Because all of the three propellants are supported by the pressure vessel 2, it is possible to operate the multi-pulse gas generator 1 which generates three pulses.

Moreover, by adopting the above mentioned configuration, it is possible to burn the inner propellant 7 with external-burning or external-end-burning. (Note that the external-end-burning is a combination of outer surface burning and end surface burning.) By using the external-burning or the external-end-burning, it is easier to secure a sufficient burning area of the inner propellant 7. By adopting the above mentioned configuration, it is not necessary to increase length of each of the propellants, it is not necessary to increase size of the multi-pulse gas generator 1, and it is possible to realize three-pulse gas generator.

Next, the configuration of the multi-pulse gas generator 1 will be explained in detail below.

As described above, the multi-pulse gas generator 1 includes the pressure vessel 2, a plurality of the propellants (the outer propellant 6, the intermediate propellant 8, and the inner propellant 7), and the internal structure 5. In addition, the multi-pulse gas generator 1 may include a front head plate 3, a rear head plate 4, a first igniter 15, a second igniter 16, a first energy transfer portion 17, a second energy transfer portion 18, and barrier membranes 9, 10, 11, 13, 14.

The pressure vessel 2 is disposed to store the plurality of propellants. The pressure vessel 2 is formed in a cylindrical shape and its central axis C is along the longitudinal direction, namely the direction of forward and backward. The pressure vessel 2 is made of material which can bear pressure generated in combusting each of the propellants. The front head plate 3 and the rear head plate 4 are disposed in the pressure vessel 2. The front head plate 3 is served as a front side cover for the pressure vessel 2. The rear head plate 4 is served as a rear side cover for the pressure vessel 2. The front head plate 3 is disposed in a front side portion of the pressure vessel 2. The rear head plate 4 is disposed in a rear side portion of the pressure vessel 2. The front head plate 3 and the rear head plate 4 are disposed to cover openings of the pressure vessel 2, respectively and fixed to the pressure vessel 2. A space for arranging the plurality of propellants (the propellants 6, 7, 8) is formed between the front head plate 3 and the rear head plate 4. Further, a plurality of exhaust holes 19 is formed on the rear head plate 4 so as to exhaust combustion gas.

The first igniter 15 and the second igniter 16 are disposed to generate energy for igniting the propellants. The first igniter 15 is attached to the rear head plate 4. The first igniter 15 is disposed to generate energy for igniting the intermediate propellant 8. On the other hand, the second igniter 16 is attached to the front head plate 3. The second igniter 16 is disposed to generate energy for igniting the outer propellant 6 and the inner propellant 7.

The first igniter 15 or the second igniter 16 is, for example, a pyrogen igniter which generates igniting gas, a laser diode, etc.

The internal structure 5 is disposed to support the inner propellant 7. The internal structure 5 is formed in a cylindrical shape and disposed in a central portion of the pressure vessel 2. The internal structure 5 has an elongate shape along the longitudinal direction, namely the direction of forward and backward. The internal structure 5 is connected on its first end to the second igniter 16. The internal structure 5 is connector on its second end to the first igniter 15. More specifically, a part of the first igniter 15 is inserted in the internal structure 5, and a part of the second igniter 16 is inserted in the internal structure 5. Therefore, internal structure 5 is supported by the rear head plate 4 via the first igniter 15, and which is supported by the front head plate 3 via the second igniter 16. Therefore, the internal structure 5 is fixed to the pressure vessel 2 as well as both the front head plate 3 and the rear head plate 4.

The internal structure 5 is made of material which can bear not to be broken in combusting the propellants. The internal structure 5 is made of, for example, metal material or plastic material such as FRP (fiber reinforced plastics).

As described above, the plurality of propellants 6, 7, 8 includes the outer propellant 6, the intermediate propellant 8 and the inner propellant 7. All of the outer propellant 6, the intermediate propellant 8 and the inner propellant 7 are formed in a cylindrical shape, respectively. The outer propellant 6 is arranged on the most outer side, the intermediate propellant 8 is arranged inside the outer propellant 6, and the inner propellant 7 is arranged inside the intermediate propellant 8.

The outer propellant 6 is supported on its outer surface by the pressure vessel 2. For example, the outer surface of the outer propellant 6 is bonded to an inner surface of the pressure vessel via adhesive. By adhesive, the outer propellant 6 is supported on its outer surface by the pressure vessel 2. The outer propellant is configured to be capable of internal-burning or internal-end-burning.

The internal structure 5 is placed to penetrate the internal side of the inner propellant 7. The inner propellant 7 is supported on its inner surface by the internal structure 5. For example, the inner surface of the inner propellant 7 is bonded to an outer surface of the internal structure 5. The inner propellant is configured to be capable of external-burning or external-end-burning.

The intermediate propellant 8 is supported by the outer propellant 6 and the inner propellant 7 by being sandwiched between the outer propellant 6 and the inner propellant 7. The intermediate propellant 8 is configured to be capable of rear end burning (rear end face burning).

A space between the plurality of propellants 6, 7, 8 and the front head plate 3 is filled with filling material 23. On the other hand, a space 22 exists between the plurality of propellants 6, 7, 8 and the rear head plate 4. Note that a part of the first igniter 15 is exposed to the space 22.

Next, a configuration of a plurality of barrier membranes 9, 10, 11, 13, 14 will be described.

The plurality of barrier membranes 9, 10, 11, 13, 14 is arranged for the purpose of, for example, protecting the propellants from heat. The plurality of barrier membranes 9, 10, 11, 13, 14 includes a first barrier membrane 9, a second barrier membrane 10, a third barrier membrane 13, a fourth barrier membrane 14 and a fifth barrier membrane 11.

The fifth barrier membrane 11 is disposed to cover a front side end of the plurality of propellants 6, 7, 8. The fifth barrier membrane 11 is disposed between the filling material 23 and each of the plurality of propellants.

The first barrier membrane 9 is disposed to isolate the outer propellant 6 and the intermediate propellant 8 from each other. The first barrier membrane 9 is connected on its front end to the fifth barrier membrane 11.

The second barrier membrane 10 is disposed to isolate the intermediate propellant 8 and the inner propellant 7 from each other. The second barrier membrane 10 is connected on its front end to the fifth barrier membrane 11.

Note that the fifth barrier membrane 11, the first barrier membrane 9 and second barrier membrane 10 may be formed by integral molding by using a mold.

The third barrier membrane 13 is disposed to cover a rear end surface of the outer propellant 6. The third barrier membrane 13 is supported by the pressure vessel 2. The third barrier membrane 13 is connected on its internal end to a rear end of the first barrier membrane 9. The third barrier membrane 13 and the first barrier membrane 9 are attached to each other via, for example, adhesive. The third barrier membrane 13 and the first barrier membrane 9 are configured to separate from each other in response to combustion of the outer propellant 6. In other words, bonding strength between the third barrier membrane 13 and the first barrier membrane 9 is set so as to be separated from each other in combusting the outer propellant 6.

The fourth barrier membrane 14 is disposed to cover a rear end surface of the inner propellant 7. The fourth barrier membrane 14 is supported by the internal structure 5. The fourth barrier membrane 14 is connected on its external end to a rear end of the second barrier membrane 10. The fourth barrier membrane 14 and the second barrier membrane 10 are attached to each other via, for example, adhesive. The fourth barrier membrane 14 and the second barrier membrane 10 are configured to separate from each other in response to combustion of the inner propellant 7. In other words, bonding strength between the fourth barrier membrane 14 and the second barrier membrane 10 is set so as to be separated from each other in combusting the inner propellant 7.

Note that a barrier membrane is not provided at a rear end surface of the intermediate propellant 8. The rear end surface of the intermediate propellant 8 is exposed to the space 22.

Each of the barrier membranes 9, 10, 11, 13, 14 is made of elastic material. For example, each of the barrier membranes 9, 10, 11, 13, 14 is made of EPDM rubber, silicone rubber, silicone rubber containing inorganic fibers such as Kevlar, etc.

Next, the first energy transfer portion 17 and the second energy transfer portion 18 will be described. The first energy transfer portion 17 is a portion which transfers energy generated by the second igniter 16 to the outer propellant 6.

The first energy transfer portion 17 is connected on a first end to the second igniter 16 and which is connected on a second end to the outer propellant 6. The second energy transfer portion 18 is a portion which transfers energy generated by the second igniter 16 to the inner propellant 7. The second energy transfer portion 18 is connected on a first end to the second igniter 16 and which is connected on a second end to the inner propellant 7. The first energy transfer portion 17 is disposed in the filling material 23 and which extends to penetrate the fifth barrier membrane 11. The second energy transfer portion 18 is disposed in the filling material 23 and which extends to penetrate the fifth barrier membrane 11.

A structure corresponding to a type of energy generated by the second igniter 16 is adopted as each structure of the energy transfer portions 17, 18. For example, in case that the second igniter 16 is configured to generate igniting gas as the energy, a gas flow passage or a pipe is used as each of the energy transfer portions 17, 18. Alternatively, in case that the second igniter 16 comprises a laser diode, for example, an optical fiber is used as each of the energy transfer portions 17, 18.

By adopting the configuration described above, it is possible to arrange three kinds of propellants in the pressure vessel 2. In other words, the outer propellant 6 is supported by the pressure vessel 2, the inner propellant 7 is supported by the internal structure 5, and the intermediate propellant 8 is supported by being sandwiched between the outer propellant 6 and the inner propellant 7. Therefore all of the propellants can be supported securely.

In addition, because the inner propellant 7 can be supported by the internal structure 5, it is possible to improve a propellant ratio of the propellants in the pressure vessel 2. Note that the propellant ratio is a value obtained by dividing a weight of propellants by a weight of the gas generator with propellants (in other words, a value obtained by dividing a weight of propellants by a weight of the gas generator before the propellants start burning).

Moreover, according to the present embodiment, because the internal structure 5 is formed in a tubular shape, it is possible to effectively utilize a space inside the internal structure 5. For example, in case that the part of the first igniter 15 is inserted in the internal structure 5, it is possible to improve heat resistance of the first igniter 15. Further, in case that cables etc. are disposed inside the internal structure 5, it is possible to omit a space occupied by the cables.

Further, according to the present embodiment, because the inner propellant 7 is supported by the internal structure 5, it is possible to burn the inner propellant 7 by the external-burning or the external-end-burning. For example, in case that each of the propellants is supported by the pressure vessel 2, each of the propellants is inevitably formed in the internal-burning type shape or the internal-end-burning type shape. However, according to the present embodiment, because the inner propellant 7 can be formed in the external-burning type shape or the external-end-burning type shape, it is possible to increase a burning area. As a result, it is possible to secure a sufficient burning area for the inner propellant 7 without increasing a length of the pressure vessel 2.

Of course, it is possible to arrange a plurality of propellants along the longitudinal direction for the purpose of just increasing the number of pulses. In this case, however, the length of the multi-pulse gas generator becomes longer. On the contrary, according to the present embodiment, because the intermediate propellant 8 is disposed inside the outer propellant 6 and the inner propellant 7 is disposed inside the intermediate propellant 8, it is not necessary to increase the length of the multi-pulse gas generator. From these points, the present embodiment is advantageous.

Next, the operation method of the multi-pulse gas generator 1 will be described. The multi-pulse gas generator according to some embodiments can be operated with either two pulses or three pulses.

Firstly, the operation method of the multi-pulse gas generator 1 with two pulses will be described. FIG. 2A-FIG. 2D are views for explaining the operation method of the multi-pulse gas generator which generates two pulses.

Figure 2A:
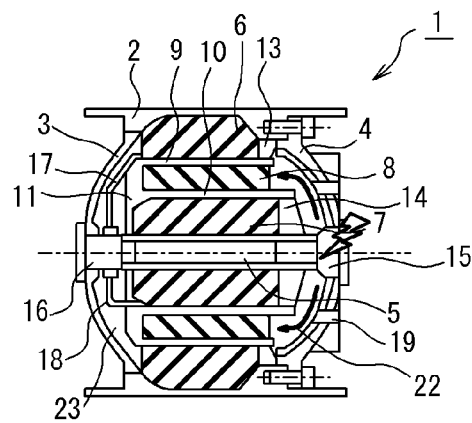
FIG. 2A is a view for explaining an operation method of the multi-pulse gas generator which generates two pulses.
Figure 2B:
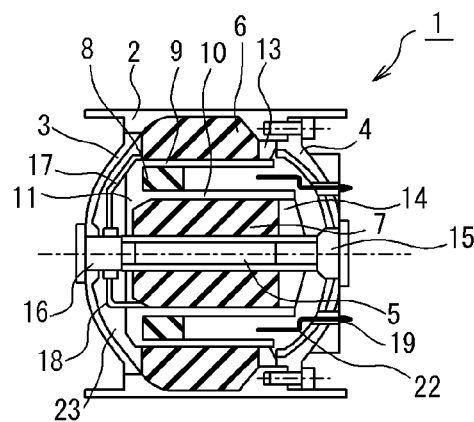
FIG. 2B is another view for explaining the operation method of the multi-pulse gas generator which generates two pulses.

In a first step, as shown in FIG. 2A, the intermediate propellant 8 is ignited by the first igniter 15. More specifically, the energy for igniting the intermediate propellant 8 is generated by the first igniter 15. The generated energy is transferred to the intermediate propellant 8 via the space 22. After the energy transfer, as shown in FIG. 2B, the intermediate propellant 8 starts burning from the rear end surface. By burning the intermediate propellant 8, combustion gas is generated. The generated combustion gas is exhausted from each of combustion gas exhaust holes 19 via the space 22.

Figure 2C:
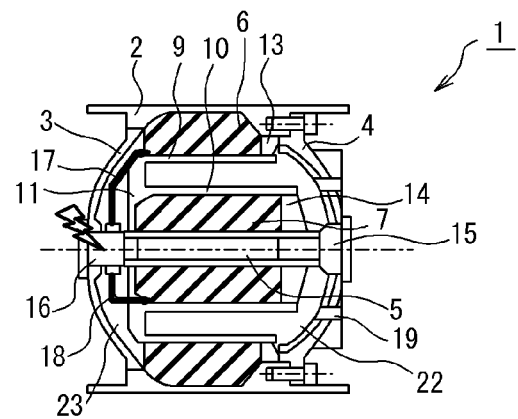
FIG. 2C is still another view for explaining the operation method of the multi-pulse gas generator which generates two pulses.

After burning the intermediate propellant 8, in a second step, as shown in FIG. 2C, the outer propellant 6 and the inner propellant 7 are ignited by the second igniter 16 simultaneously. More specifically, the energy for igniting the outer propellant 6 and the inner propellant 7 is generated by the second igniter 16. The generated energy is transferred to the outer propellant 6 via the first energy transfer portion 17. At the same time, the generated energy is transferred to the inner propellant 7 via the second energy transfer portion 18.

Figure 2D:
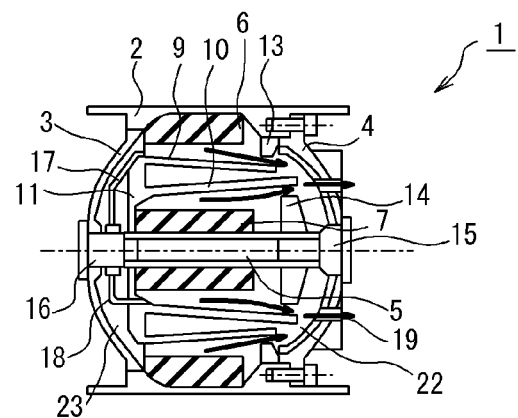
FIG. 2D is yet another view for explaining the operation method of the multi-pulse gas generator which generates two pulses.

After the energy transfer, as shown in FIG. 2D, the outer propellant 6 and the inner propellant 7 start burning. The outer propellant 6 successively burns at its inner surface and its rear end surface. The inner propellant 7 successively burns at its outer surface and its rear end surface. When the outer propellant 6 and the inner propellant 7 start burning, there exists a space which has been formed between the outer propellant 6 and the inner propellant 7 by burning out the intermediate propellant 8. Therefore, the first barrier membrane 9 is pushed inward by pressure generated according to the burn of the outer propellant 6. As a result, the first barrier membrane 9 and the third barrier membrane 13 are separated from each other. After the separation, combustion gas generated by the burn of the outer propellant 6 is exhausted from the each of combustion gas exhaust holes 19 via the space 22. Similarly, the second barrier membrane 10 is pushed outward by pressure generated according to the burn of the inner propellant 7. As a result, the second barrier membrane 10 and the fourth barrier membrane 14 are separated from each other. After the separation, combustion gas generated by the burn of the inner propellant 7 is also exhausted from the each of combustion gas exhaust holes 19 via the space 22.

As described above, it is possible to burn the propellants with two pulses.

Secondly, the operation method of the multi-pulse gas generator 1 with three pulses will be described. FIG. 3A-FIG. 3F are views for explaining the operation method of the multi-pulse gas generator which generates three pulses.

Figure 3A:
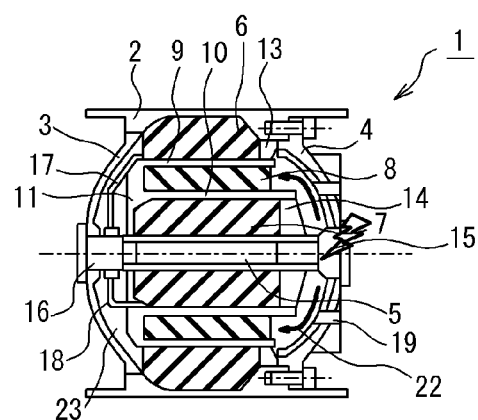
FIG. 3A is a view for explaining an operation method of the multi-pulse gas generator which generates three pulses.
Figure 3B:
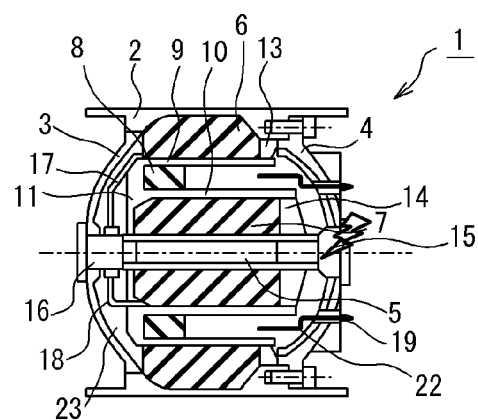
FIG. 3B is another view for explaining the operation method of the multi-pulse gas generator which generates three pulses.

In a first step, as shown in FIG. 3A, the intermediate propellant 8 is ignited by the first igniter 15. After ignition, as shown in FIG. 3B, the intermediate propellant 8 starts burning from the rear end surface.

Figure 3C:
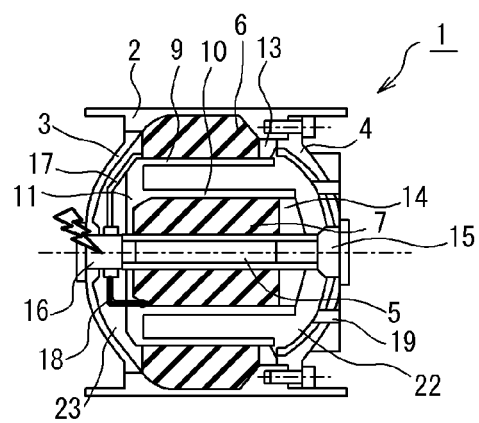
FIG. 3C is still another view for explaining the operation method of the multi-pulse gas generator which generates three pulses.
Figure 3D:
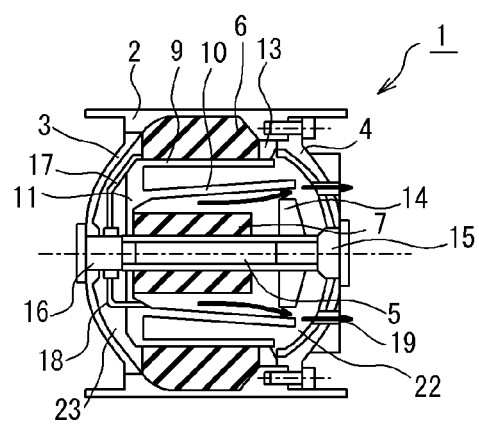
FIG. 3D is yet another view for explaining the operation method of the multi-pulse gas generator which generates three pulses.

After burning the intermediate propellant 8, in a second step, as shown in FIG. 3C, the inner propellant 7 is ignited by the second igniter 16. After the ignition of the inner propellant 7, the inner propellant 7 burns at its outer surface and its rear end surface as shown in FIG. 3D. When the inner propellant 7 burns, the second barrier membrane 10 is pushed outward. As a result, the second barrier membrane 10 and the fourth barrier membrane 14 are separated from each other and a gap is formed between the second barrier membrane 10 and the fourth barrier membrane 14. Consequently, combustion gas generated by the burn of the inner propellant 7 is exhausted from the each of combustion gas exhaust holes 19 via the space 22.

Figure 3E:
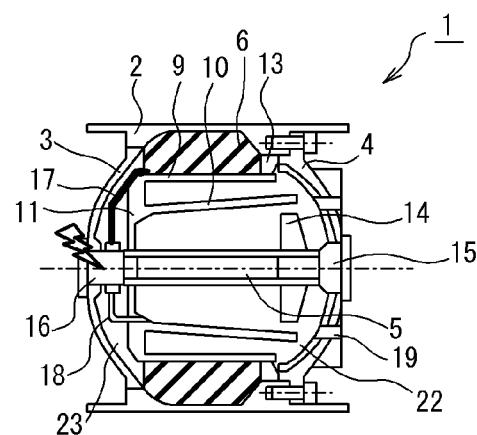
FIG. 3E is still another view for explaining the operation method of the multi-pulse gas generator which generates three pulses.
Figure 3F:
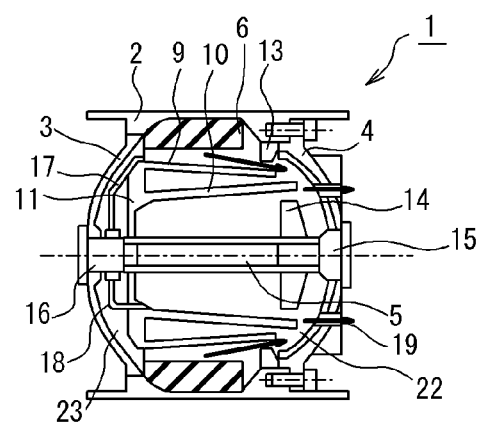
FIG. 3F is yet another view for explaining the operation method of the multi-pulse gas generator which generates three pulses.

After burning the inner propellant 7, in a third step, as shown in FIG. 3E, the outer propellant 6 is ignited by the second igniter 16. After ignition of the outer propellant 6, the outer propellant 6 burns at its inner surface and its rear end surface as shown in FIG. 3F. When the outer propellant 6 burns, the first barrier membrane 9 is pushed inward. As a result, the first barrier membrane 9 and the third barrier membrane 13 are separated from each other and a gap is formed between the first barrier membrane 9 and the third barrier membrane 13. Consequently, combustion gas generated by the burn of the outer propellant 6 is exhausted from the each of combustion gas exhaust holes 19 via the space 22.

As described above, it is possible to burn the propellants with three pulses.

According to some embodiments, the intermediate propellant 8 burns firstly, and the inner propellant 7 and the outer propellant 6 burn secondly. The intermediate propellant 8 burns at its rear end surface. On the other hand, the inner propellant 7 burns at either of its outer side surface or both its outer side surface and its rear end surface, and the outer propellant 6 burns at either of its inner side surface or both its inner side surface and its rear end surface. Propelling power generated by the burn of both the inner propellant 7 and the outer propellant 6 can be greater than propelling power generated by the burn of intermediate propellant 8 because of the difference of burning area. Therefore, the present embodiment can be favorably applied when propelling power required in the second pulse or further later pulse is greater than propelling power required in the first pulse.

The case that the outer propellant 6 burns after the inner propellant 7 burns is described above as one example. Alternatively, it is possible to burn the outer propellant 6 before the inner propellant 7 burns. Note that the barrier membrane (the first barrier membrane 9 or the second barrier membrane 10) cannot deform unless the space between the inner propellant 7 and the outer propellant 6 is formed. Therefore, it is required that the intermediate propellant 8 burns before the inner propellant 7 and the outer propellant 6.

According to some embodiments, the case that the pressure vessel is formed in a cylindrical shape and the each of the propellants 6, 7, 8 is formed in a cylindrical shape is described. In this disclosure, the term "cylindrical" should not be construed in its strictest sense. If the cross-sectional view perpendicular to the elongated direction of an object is generally a shape of circle or ring, the shape of the object belongs to "cylindrical" shape. Moreover, the shape of the pressure vessel is not limited to a cylindrical shape. The shape of the pressure vessel may be a tubular shape. Regarding to the tubular shape, length along longitudinal direction of a tube is arbitrary. Similarly, the shape of the each of the propellants is not limited to a cylindrical shape. The shape of the each of the propellants may be a tubular shape.

Next, an application example of the multi-pulse gas generator 1 according to some embodiments will be described.

Figure 4:
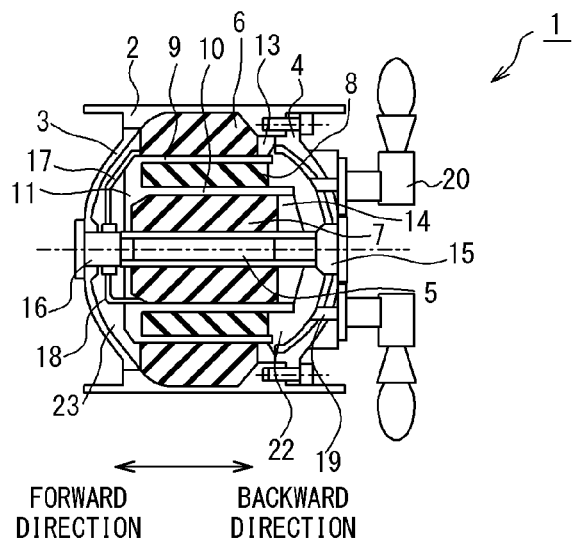
FIG. 4 is a view for explaining an example case that the multi-pulse gas generator is applied to a thruster.

FIG. 4 is a view for explaining an example case that the multi-pulse gas generator is applied to a thruster. As shown in FIG. 4, thrusters 20 are connected to the multi-pulse gas generator 1 at the locations of the combustion gas exhaust holes 19, respectively. Each of the thrusters 20 is configured to exhaust the combustion gas, which is introduced from each of the combustion gas exhaust holes 19, to the direction perpendicular to the longitudinal direction (the direction of forward and backward). It is possible to execute attitude control by this thruster 20. According to the present embodiment, it is possible to finely control the attitude of the missile because the multi-pulse gas generator 1 can burn the propellants in three steps.

Figure 5:
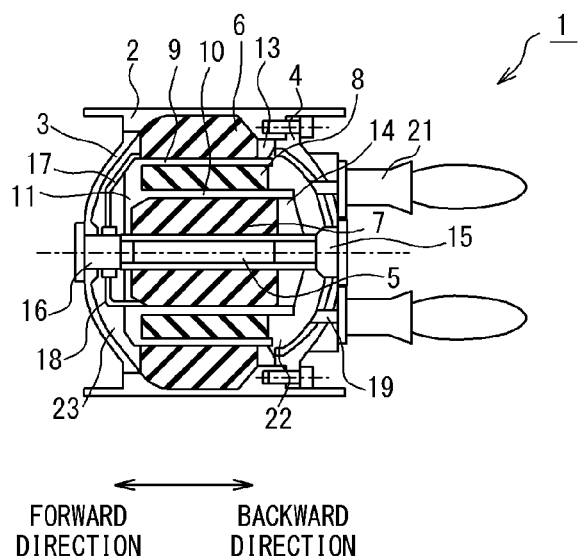
FIG. 5 is a view for explaining an example case that the multi-pulse gas generator is applied to a rocket motor.

FIG. 5 is a view for explaining an example case that the multi-pulse gas generator is applied to a rocket motor. As shown in FIG. 5, nozzles 21 are connected to the multi-pulse gas generator 1 at the locations of the combustion gas exhaust holes 19, respectively. Each of the nozzles 21 is configured to exhaust the combustion gas, which is introduced from each of the combustion gas exhaust holes 19, to the backward direction. As mentioned above, it is possible to obtain the propelling power in three steps, if the multi-pulse gas generator is applied to the rocket motor.

Note that the gas generator according to some embodiments can be applied to a missile or another type of a flying body such as a rocket.

As mentioned above, the present invention has been described by referring to embodiments. However, the present invention is not limited to the above-mentioned embodiments. Various modifications can be performed on the above-mentioned embodiments. For example, any combination within a range compatible to each other with regard to the above-mentioned embodiments may be regarded as the embodiment of the present invention.

What is claimed is:
1. A multi-pulse gas generator comprising:
a pressure vessel;
a front head plate fixed to the pressure vessel;
a rear head plate fixed to the pressure vessel;
an outer propellant disposed in the pressure vessel and having a tubular shape;
an intermediate propellant disposed inside the outer propellant and having a tubular shape;
an inner propellant disposed inside the intermediate propellant and having a tubular shape;
a first igniter configured to generate energy for igniting the intermediate propellant;
a second igniter configured to generate energy for igniting the outer propellant and the inner propellant;
a first energy transfer portion configured to transfer the energy generated by the second igniter to the outer propellant;
a second energy transfer portion configured to transfer the energy generated by the second igniter to the inner propellant;
an internal structure disposed inside the inner propellant and fixed to the pressure vessel;
a first barrier membrane disposed between the outer propellant and the intermediate propellant so as to isolate the outer propellant and the intermediate propellant from each other;

a second barrier membrane disposed between the intermediate propellant and the inner propellant so as to isolate the intermediate propellant and the inner propellant from each other;

a third barrier membrane disposed to cover a rear end surface of the outer propellant and supported by the pressure vessel; and a fourth barrier membrane disposed to cover a rear end surface of the inner propellant and supported by the internal structure, wherein the outer propellant is supported on its outer surface by the pressure vessel, wherein the inner propellant is supported on its inner surface by the internal structure, wherein the first barrier membrane and the third barrier membrane are attached to each other and configured to separate from each other in response to combustion of the outer propellant, wherein the second barrier membrane and the fourth barrier membrane are attached to each other and configured to separate from each other in response to combustion of the inner propellant, wherein the outer propellant, the intermediate propellant and the inner propellant are disposed between the front head plate and the rear head plate, wherein the internal structure is supported on its first end by the front head plate, and wherein the internal structure is supported on its second end by the rear head plate.

2. The multi-pulse gas generator according to claim 1, wherein the internal structure has a tubular shape.

3. The multi-pulse gas generator according to claim 1, wherein the inner propellant has an external-burning shape or an external-end-burning shape.

4. An operation method of a multi-pulse gas generator, the multi-pulse gas generator comprising:

a pressure vessel;

an outer propellant disposed in the pressure vessel and having a tubular shape;

an intermediate propellant disposed inside the outer propellant and having a tubular shape;

an inner propellant disposed inside the intermediate propellant and having a tubular shape;

an internal structure disposed inside the inner propellant and fixed to the pressure vessel;

a first barrier membrane disposed between the outer propellant and the intermediate propellant so as to isolate the outer propellant and the intermediate propellant from each other; and a second barrier membrane disposed between the intermediate propellant and the inner propellant so as to isolate the intermediate propellant and the inner propellant from each other, wherein the outer propellant is supported on its outer surface by the pressure vessel, and wherein the inner propellant is supported on its inner surface by the internal structure, the operation method comprising:

combusting the intermediate propellant;

combusting the outer propellant after combusting the intermediate propellant; and combusting the inner propellant after combusting the intermediate propellant.

5. The operation method according to claim 4, wherein the combusting of the outer propellant and the combusting of the inner propellant are performed simultaneously.

\* \* \* \* \*